United States Patent [19]
Schneider

[11] Patent Number: 5,771,293
[45] Date of Patent: Jun. 23, 1998

[54] SWITCHING ARRANGEMENT FOR MOBILE RADIO RECEIVERS

[75] Inventor: Steffen Schneider, Munich, Germany

[73] Assignee: Bayerische Motoren Werke Aktiengesellschaft, Munich, Germany

[21] Appl. No.: 752,262

[22] Filed: Nov. 18, 1996

[30] Foreign Application Priority Data

Nov. 16, 1995 [DE] Germany ............... 195 42 737.8

[51] Int. Cl.⁶ ...................................... H04H 5/00
[52] U.S. Cl. ................................. 381/10; 381/11
[58] Field of Search .......................... 381/10, 11, 12

[56] References Cited

U.S. PATENT DOCUMENTS

| | | |
|---|---|---|
| 4,390,749 | 6/1983 | Pearson . |
| 4,653,116 | 3/1987 | Lindenmeier et al. . |
| 5,201,062 | 4/1993 | Nakamura et al. ............ 381/10 |
| 5,432,854 | 7/1995 | Honjo et al. .................. 381/10 |

FOREIGN PATENT DOCUMENTS

| | | |
|---|---|---|
| 0 030 874 | 6/1981 | European Pat. Off. . |
| 0 103 917 | 3/1984 | European Pat. Off. . |
| 0 132 752 | 2/1985 | European Pat. Off. . |
| 0 565 256 | 10/1993 | European Pat. Off. . |
| 29 29 647 | 2/1981 | Germany . |
| 30 34 937 | 4/1981 | Germany . |
| 31 31 292 A1 | 5/1982 | Germany . |
| 31 31 292 C2 | 5/1982 | Germany . |
| 43 24 304 | 1/1995 | Germany . |

*Primary Examiner*—Forester W. Isen
*Attorney, Agent, or Firm*—Evenson, McKeown, Edwards & Lenahan, P.L.L.C.

[57] ABSTRACT

In the case of a switching arrangement for mobile radio receivers having a device for adjusting the stereo playback portion relative to the mono playback portion as a function of multipath effects, the resetting time of mono to stereo playback is a function of the relative frequency, intensity and length of multipath effects.

10 Claims, 2 Drawing Sheets

SWITCHING ARRANGEMENT FOR MOBILE RADIO RECEIVERS

BACKGROUND AND SUMMARY OF THE INVENTION

This invention relates to a switching arrangement and, more particularly, to a switching arrangement for mobile radio receivers having a device for setting the stereo playback portion relative to the mono playback portion as a function of multipath effects.

In the case of this switching arrangement, it is known to immediately switch from a stereo to a mono playback when a multipath effect occurs. A multipath effect is the time-delayed arrival of several identical transmission signals at the receiver. Different transit times of the transmission signals occur as a result of reflections and shading of the transmission signal on the path between the transmitter and the receiver. As a rule, multipath phenomena clearly impair the playback quality. In order to avoid this, a switch-over takes place to a mono replay and the audibility of acoustic interferences is therefore reduced.

Mono instead of stereo playback as a rule results in an impairment of the playback comfort. A frequent switching between mono and stereo results in the occurrence of a "pumping" effect which clearly influences the playback quality. On the other hand, when a multipath effect occurs, it is necessary to switch immediately from stereo to mono. A sliding and relatively slow switching back to stereo when a multipath effect has disappeared will impair the playback quality, particularly when the multipath effect occurs relatively seldom and briefly. Typically, this will take place in the outskirts of a city because relatively strong local transmitters exist in these areas and rarely are there effective reflectors for the transmission signals. However, the multipath effect will occur frequently in the vicinity of high mountains because massive reflectors exist there while the receiving power is reduced at the same time.

The invention is based on the object of providing a switching arrangement of the above-mentioned type in the case of which the influence of multipath effects on the playback quality in comparison to the known switching arrangement is clearly reduced.

The invention achieves this object by providing a switching arrangement for mobile radio receivers having a device for setting the stereo playback portion relative to the mono playback portion as a function of multipath effects. The resetting time from the mono to the stereo playback is a function of the relative frequency and/or intensity and/or length of the multipath effects.

The frequency, intensity and/or length of multipath interferences is important. If these occur sporadically or briefly; for example, less than once per second and/or their length is less than 100 msec, at the end of the interference a switching back from mono to stereo playback is to take place with a resetting time which is as short as possible. A typical resetting time is less than 50 msec. Multipath interferences are then hardly audible, just like the switching from stereo to mono and back to stereo.

In the case of frequent, strong and longer multipath interferences of, for example, more than once per second and/or for longer than 100 msec, when the multipath interference disappears, the switching to stereo takes place with a clearly longer resetting time (for example 1.5 seconds). This results in the advantage that, when a multipath interference occurs again, only the mono playback portion must be enlarged while the stereo playback portion is much smaller than the mono playback portion anyhow. A constant, negatively noticeable switching from the stereo to the mono playback and back to stereo will hardly manifest itself.

In the case of an infrequent occurrence, the resetting time of mono to stereo is minimal, but, in the case of a frequent occurrence, it is maximal, for example, 1.5 seconds. It is possible to make a selection between only two resetting times as a function of the frequency, the intensity and the length of the monopath interferences. In contrast, for improving the playback quality, it is advantageous to make the resetting time variable as a function of the frequency. In the case of monopath interferences, for example, below 1 Hz, the playback time is minimal; as indicated, for example, shorter than 50 msec. In the case of, for example, 2 Hz, it is equal to 100 msec; in the case of, for example, 3 Hz, it is 500 msec; in the case of, for example, 4 Hz, it is 1,000 msec; and in the case of a frequency higher than 5 Hz, it is maximally 1.5 sec.

Other objects, advantages and novel features of the present invention will become apparent from the following detailed description of the invention when considered in conjunction with the accompanying drawings.

DETAILED DESCRIPTION OF THE DRAWINGS

Figure 1:
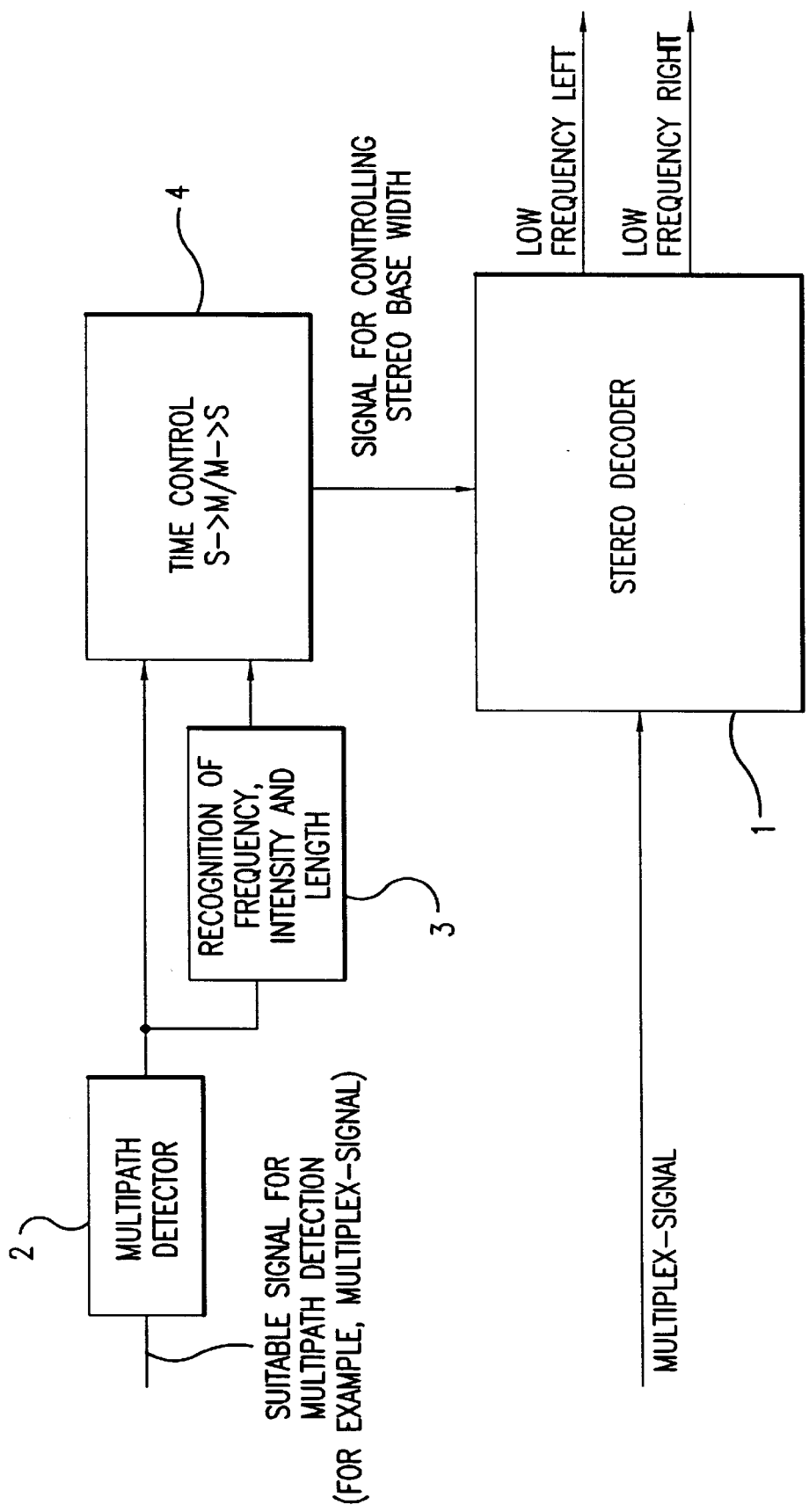
FIG. 1 is a schematic block diagram of a mobile radio receiver in accordance with the present invention.

FIG. 1 schematically shows the basic construction of a mobile radio receiver for use, for example, in a motor vehicle. The multiplex receiving signal arrives in a stereo decoder 1 and is emitted there as a low frequency signal for the left and the right playback channel. The receiving signal is also conducted by way of a multipath detector 2 which detects the occurrence of multipath interferences. Examples in this respect are found in European Patent Document EP 0 132 752 B (corresponding to U.S. Pat. No. 4,653,116) and U.S. Patent Document U.S. Pat. No. 4,390,749, the specifications of which are expressly incorporated by reference herein.

Behind the detector 2, a circuit 3 is arranged by which the frequency, intensity and/or length of multipath interferences are detected. The output signals of the circuit 3 and of the detector 2 arrive in a processing circuit 4 by which a signal is generated for controlling the stereo base width.

Figure 2:
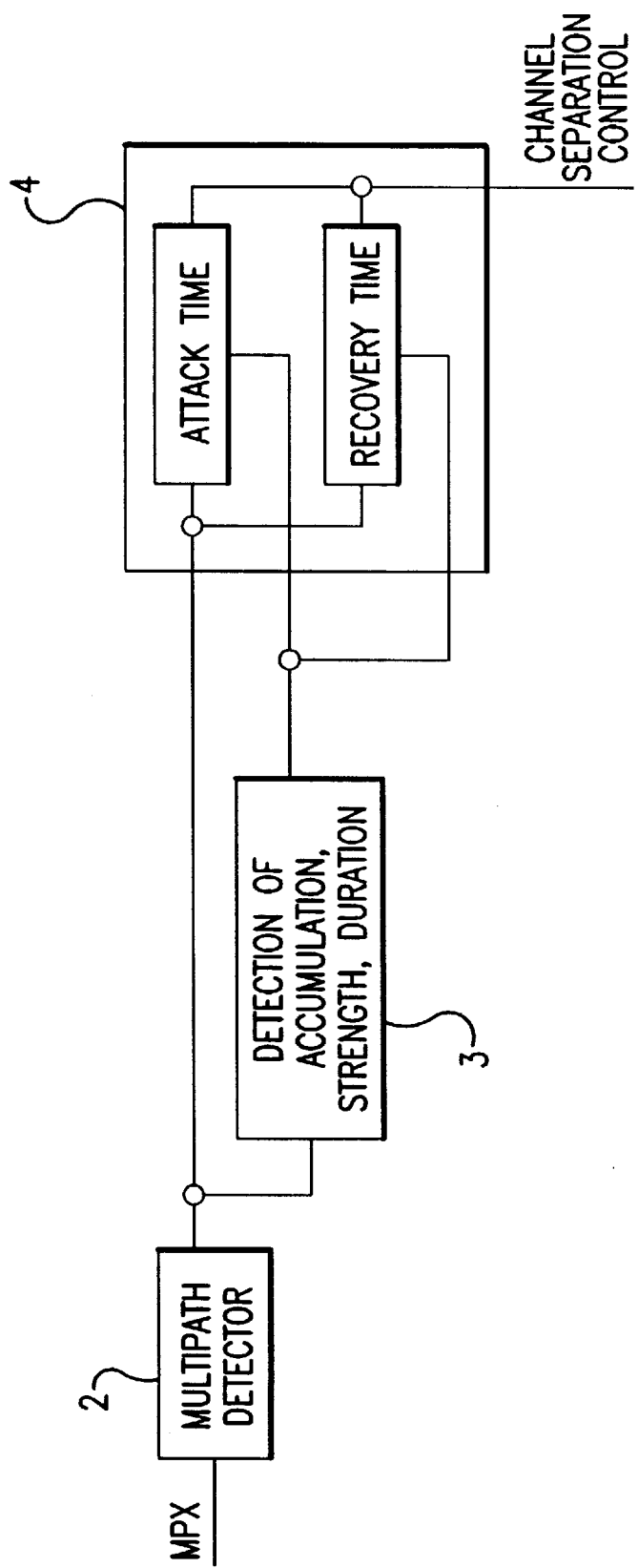
FIG. 2 is a schematic block diagram of the time control circuit 4 shown in FIG. 1 according to the present invention.

Referring to FIG. 2, there is shown a schematic block diagram of the time control circuit 4. The time control circuit 4 receives the multipath detection signal and the detected frequency, intensity and length signals from the multipath detector 2 and the detector circuit 3, respectively. The time control circuit 4 outputs the channel separation control signal to the stereo decoder 1. The time control circuit 4 includes an attack timer circuit and a recovery timer circuit. Both the attack timer circuit and recovery timer circuit receive inputs from the multipath detector 2 and the frequency, intensity and length detector circuit 3. The attack timer controls the changing from stereo to mono (S→M) whereas the recovery timer controls the change back again from mono to stereo (M→S).

By means of the processing circuit 4, the playback portion of the stereo reception is determined in relationship to the mono reception. In the case of a reception of signals which have a frequent, strong and long multipath disturbance, a long mono-stereo resetting time of, for example, 1.5 seconds, is set. Despite the thus caused longer mono phases, in view of the receiving signal which is interfered with anyhow, the playback quality appears to be acceptable. If multipath disturbances occur only rarely, a short resetting time from mono to stereo playback is used. The short-time changes to mono which will then occur only infrequently will hardly be noticeable. This results in a clear improvement of the playback quality because a switching to mono playback must take place only to an extent absolutely necessary because of the occurring multipath interferences.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A switching arrangement for a mobile radio receiver having a device for setting a stereo playback portion relative to a mono playback portion as a function of multipath effects, wherein a resetting time from a mono playback portion to a stereo playback portion is varied as a function of the detected value of at least one of a relative frequency, or length of the multipath effects.

2. The switching arrangement according to claim 1, wherein for at least one of a low frequency, a low intensity, and a short length of the multipath effects, said resetting time is minimal.

3. The switching arrangement according to claim 1, wherein for at least one of a high frequency, a high intensity, and a long length of the multipath effects, said resetting time is maximal.

4. The switching arrangement according to claim 2, wherein for at least one of a high frequency, a high intensity, and a long length of the multipath effects, said resetting time is maximal.

5. The switching arrangement according to claim 2, wherein said resetting time is variable as a function of at least one of a frequency, an intensity, and a length of the multipath effects.

6. The switching arrangement according to claim 3, wherein said resetting time is variable as a function of at least one of a frequency, an intensity, and a length of the multipath effects.

7. The switching arrangement according to claim 4, wherein said resetting time is variable as a function of at least one of a frequency, an intensity, and a length of the multipath effects.

8. A mobile radio receiver, comprising:
   a stereo decoder receiving a multiplex signal and outputting low frequency signals for left and right playback channels respectively;
   a multipath detector receiving said multiplex signal and detecting an occurrence of multipath interferences and outputting a multipath detected output signal;
   means for detecting a frequency, an intensity, and a length of multipath interferences in order to provide a detected output signal; and
   a processor which receives said multipath detected signal and said detected output signal in order to generate a control signal which controls a stereo base width of said stereo decoder, wherein said control signal varies a resetting time from a mono playback to a stereo playback as a function of the detected value of at least one of a relative frequency or a length of the multipath interferences.

9. A method for operating a mobile radio receiver having a device for setting a stereo playback portion relative to a mono playback portion as a function of multipath effects, the method comprising the steps of:
   detecting an occurrence of multipath interferences;
   determining a value of at least one of a frequency or a length of said detected multipath interferences; and
   controlling a stereo base width in dependence on said detected multipath interferences and said determined frequency, intensity and length of said multipath interferences such that a resetting time from the mono playback portion to a stereo playback portion is a function of the detected value of at least one of a relative frequency or length of said multipath effects.

10. A switching arrangement for a mobile radio receiver having a device for setting a stereo playback portion relative to a mono playback portion as a function of multipath effects, wherein a resetting time from mono playback portion to stereo playback portion is a function of the detected value of at least one of a relative frequency and length of the multipath effects.

* * * * *